(12) United States Patent  
Chase

(10) Patent No.: US 8,419,806 B2
(45) Date of Patent: Apr. 16, 2013

(54) DISCRIMINATING DATA PROTECTION SYSTEM

(75) Inventor: Robert Chase, Vancouver (CA)

(73) Assignee: Absolute Software Corporation, Vancouver, British Columbia (CA)

( * ) Notice: Subject to any disclaimer, the term of this patent is extended or adjusted under 35 U.S.C. 154(b) by 162 days.

(21) Appl. No.: 12/774,603

(22) Filed: May 5, 2010

(65) Prior Publication Data

US 2010/0287619 A1 Nov. 11, 2010

Related U.S. Application Data

(60) Provisional application No. 61/175,759, filed on May 5, 2009.

(51) Int. Cl.
*G06F 21/00* (2006.01)

(52) U.S. Cl.
USPC .............................................. 726/35; 726/26

(58) Field of Classification Search ............ 726/26, 726/34, 35
See application file for complete search history.

(56) References Cited

U.S. PATENT DOCUMENTS

| | | | |
|---|---|---|---|
| 5,107,419 A | 4/1992 | MacPhail | |
| 5,144,556 A | 9/1992 | Wang et al. | |
| 5,297,278 A | 3/1994 | Wang et al. | |
| 5,689,699 A | 11/1997 | Howell et al. | |
| 6,148,312 A | 11/2000 | Paik et al. | |
| 6,480,096 B1 | 11/2002 | Gutman et al. | |
| 6,507,914 B1 | 1/2003 | Cain et al. | |
| 7,024,698 B2 * | 4/2006 | Tanaka et al. | 726/26 |
| 7,155,745 B1 | 12/2006 | Shin et al. | |
| 7,159,120 B2 * | 1/2007 | Muratov et al. | 713/182 |
| 7,421,589 B2 | 9/2008 | Williams et al. | |
| 2003/0221115 A1 | 11/2003 | Itoh et al. | |
| 2005/0044404 A1 | 2/2005 | Bhansali et al. | |
| 2005/0186954 A1 | 8/2005 | Kenney | |
| 2005/0216757 A1 | 9/2005 | Gardner | |
| 2006/0272020 A1 | 11/2006 | Gardner | |
| 2007/0056043 A1 * | 3/2007 | Onyon et al. | 726/26 |
| 2007/0136821 A1 | 6/2007 | Hershaft et al. | |
| 2010/0031349 A1 | 2/2010 | Bingham | |

OTHER PUBLICATIONS

Caspar Rose, "The Transfer of Property Rights by Theft: An Economic Analysis", Center for Law, Economics, and Financial Institutions at CBS, pp. 1-36, Oct. 2005. http://openarchive.cbs.dk/bitstream/handle/10398/6802/wplefic092005.pdf?sequence=1.*
PCT International Search Report, PCT/CA2010/000720, Sep. 7, 2010.
International Preliminary Report on Patentability for PCT Application No. PCT/CA2010/000720 filed Aug. 26, 2011.

* cited by examiner

*Primary Examiner* — Hadi Armouche
*Assistant Examiner* — Lisa Lewis
(74) *Attorney, Agent, or Firm* — Knobbe, Martens, Olson & Bear, LLP

(57) ABSTRACT

A data protection system selectively deletes data from an electronic device when the device is reported as lost or stolen, or when another data protection triggering event occurs. Different data files may, for example, be treated differently depending on when such files were created. For example, data files that were created while the computing device was known to be in the owner's possession may be deleted, while data files created after the electronic device left the owner's possession may be left intact (since they may have been created by an innocent user). Data files created between these two points in time may be quarantined so that they later be restored, if appropriate.

19 Claims, 4 Drawing Sheets

DISCRIMINATING DATA PROTECTION SYSTEM

CROSS-REFERENCE TO RELATED APPLICATIONS

This application claims the benefit of U.S. Provisional Patent Application No. 61/175,759, filed on May 5, 2009, the disclosure of which is hereby fully incorporated by reference.

BACKGROUND

1. Technical Field

The present disclosure relates to the protection of proprietary or sensitive data stored on computing and other electronic devices by deletion thereof following the theft or loss of such a device.

2. Description of the Related Art

Proprietary information is routinely stored on electronic computing devices such as personal computers, laptop computers and personal digital assistants, and the need to protect such proprietary or sensitive data from theft or misuse is self-evident. Accordingly, in addition to the use of basic encryption techniques and on-line monitoring systems, various systems and methods addressing the need to detect the tampering or theft of an electronic computing device without the device having to be connected to the internet at the time of tampering or theft have been proposed.

U.S. Patent Publication Nos. 2005/0216757 and 2006/0272020 describe a tamper resistant servicing agent for providing various services such as data delete upon receipt of an instruction transmitted to it.

U.S. Pat. No. 7,421,589 describes a system and method for destruction of data stored on a lost portable electronic device. A client computing device communicates periodically with a server. If communication is not established between the client and the server for a selected activation interval and a subsequent grace period, data is determined to be lost, and programmed security rules, such as data deletion rules, are automatically executed.

A drawback with existing solutions for the protection of data is that they do not distinguish between the data belonging to the original owner or authorized user of the device and the data that may be later stored on the device by a bona fide purchaser, who could unknowingly have bought the device from a thief.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below.

A system and method are disclosed for the protection of data stored on an electronic computing device by selective deletion thereof in a manner that lessens the risk of accidental deletion of data belonging to a third party.

The solution is provided by configuring a data delete/protection system to treat data files on the electronic computing device differently depending, in preferred embodiments, on when such files were created relative to one or more dates/times associated with the potential theft, loss, or unauthorized use of the electronic device. For example, data that was created while the electronic device is known to have been in the possession of the owner (e.g. the person or entity who authorized the deletion) may be deleted without any form of quarantine or backup. Data that was created after the owner is known to have lost possession of the electronic device, such as after the owner discovered that the device was lost or stolen, may be left intact on the basis that such data may have been created by an innocent user, such as the purchaser of a stolen device.

Any data created between these two points in time (e.g. between the last known use by the owner and the date on which the owner discovered the theft or loss) may or may not have been created by the owner. Consequently, this data is preferably quarantined, such as through encryption and/or transmission to a monitoring centre. This data is thus made unavailable to the current user of the electronic device, but can subsequently be restored, if appropriate.

The data deletion may occur in the background while otherwise normal operation of the electronic device is permitted. Normal operation of the device may also be permitted after data deletion has been completed. Optionally, and configurable by an administrator, a warning message may be displayed before, during or after the data deletion.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps.

DETAILED DESCRIPTION OF THE SPECIFIC EMBODIMENTS

Figure 1:
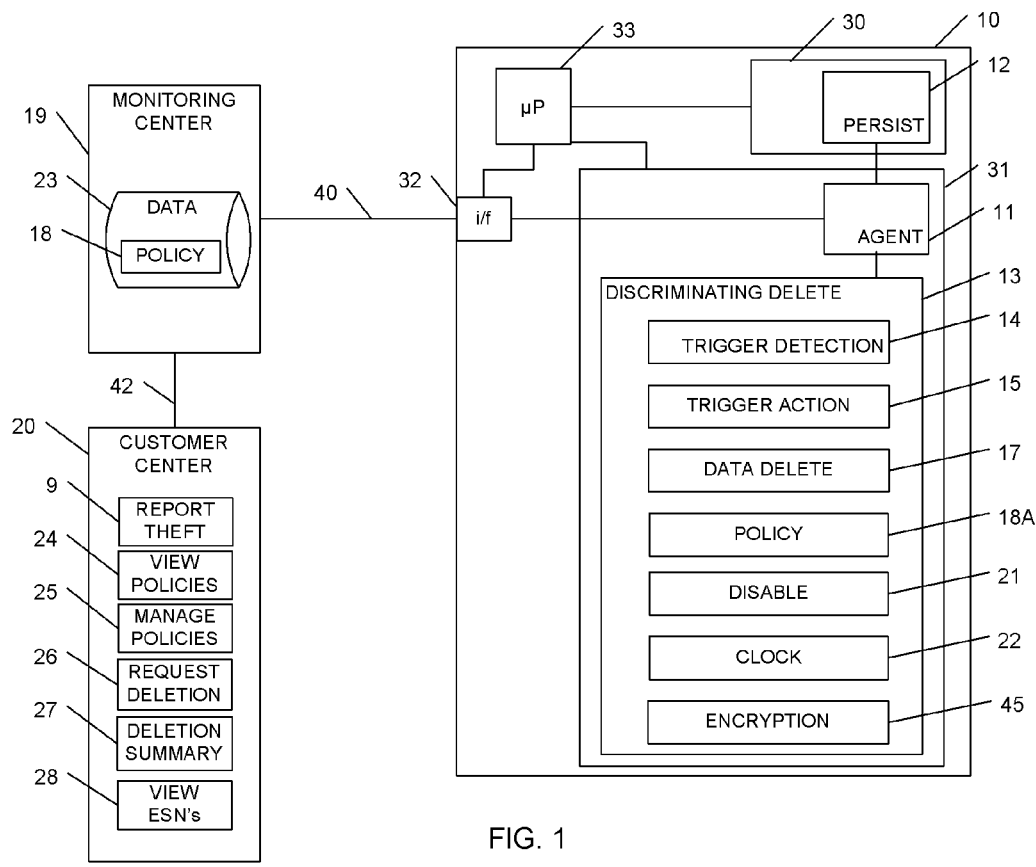
FIG. 1 is a schematic functional block diagram of a discriminating data protection system in accordance with embodiments of the disclosed subject matter.

Specific embodiments of the disclosed systems and methods will now be described with reference to the drawings. Nothing in this detail description is intended to imply that any particular component, feature, or step is essential to the invention.

Terminology

Host—The term "host" refers herein to an electronic computing device carrying data to be protected by any combination of being deleted, encrypted or retrieved. The host may be any electronic device (such as a laptop computer, a personal computer, a mobile phone, a Blackberry®, an iPhone®, an iPod®, a memory module, etc.) with a memory capable of holding data that one might want to be deleted if the host is lost, stolen, purloined or unreturned. The host can also be referred to as a "client", and in some cases as a client of a monitoring center. The host typically has an electronic serial number ("ESN") with which it can be identified, and the term "ESN" may be used instead of the term "host" to refer to the electronic device to be protected.

Agent—as used herein, this is a software, hardware or firmware (or any combination thereof) agent that is ideally persistent and stealthy, and that resides in a host computer or other electronic device. The agent facilitates servicing functions which involve communication with a remote server. The agent is tamper resistant and is enabled for supporting and/or providing various services such as data delete, firewall protection, data encryption, location tracking, message notification, and software deployment and updates. An illustrative embodiment of a suitable agent is found in the commercially available product Computrace Agent™. The technology underlying the Computrace Agent™ has been disclosed and patented in the U.S. and other countries, the patents having been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of the agent are disclosed in U.S. Patent Application Publication Nos. US2005/0216757 and US2006/0272020. The disclosures of these documents are fully incorporated by reference herein. It is feasible to use an equivalent agent to the Computrace Agent™, or less preferably an alternative agent with less functionality. The minimal functional attributes of the agent are to control in part the functioning of a computer or electronic device in which it is installed. Ideally, the agent is also persistent, and able to self-repair if it includes software. Communications may be initiated by the agent, by the monitoring center or by both. The agent may be divided into multiple parts in different locations within an electronic device.

Monitoring Center—This is a guardian server or other computer or server that the agent communicates with or sends a message to. It may be a personal computer, or it may be a distributed plurality of computers. Provided an internet connection or other telecommunications channel is available to the host, an agent may call the monitoring center once a day (or at some other selected suitable interval) to report the location of the host and download software upgrades if there are any available. In the technology disclosed herein, the agent would typically upload to the monitoring center a log file of the files that have been deleted, and transmit to the monitoring centre the files that are to be quarantined. The agent may be configured to encrypt files that are to be quarantined.

Customer Center—This is preferably a computerized system that provides a web-based interface through which a user may interact with the discriminating data delete system disclosed herein. At the customer center, a user may set up data delete policies, and a given policy may be applied to one or more hosts. A policy may be changed or disabled. Triggers, such as time delays and the permissible number of password attempts may be set or changed. Also at the customer center, a list of the files deleted and/or encrypted may be retrieved by a user. Such a user may be the owner of a host computer or the IT administrator for a group of host computers.

Discriminating Data Protection Module—In one embodiment, this comprises the Trigger Detection Client (or Offline Trigger Monitor), Trigger Action Client, the Encryption Client, the Data Delete Client and the Data Delete Policy. These are the software components residing in the host and responsible for determining when and which data should be deleted after a theft has taken place and ensuring that the data deletion is carried out. Further included in the Discriminating Data Delete Module is a Clock Utility and a Disable Utility for locally disabling the Discriminating Data Delete Module.

Discriminating Data Protection System—This term refers to the disclosed technology as a whole, and comprises the Discriminating Data Delete Module, an agent, a monitoring center and a customer center.

Offline Data Delete—This term refers to data deletion that is initiated while the host device is not connected to the internet. Data deletion initiated this way may continue if the host is subsequently connected to the internet and the agent makes a call to the monitoring center.

Online Data Delete—This term refers to data deletion that is initiated when the host is connected to the internet and the agent is in communication with the monitoring center. In this case, the deletion of data may continue after the communication has been terminated.

User—This term is generally used to refer to the person who legitimately operates the host device.

Administrator—Refers to the person who interacts with the customer center. The administrator may be the same person as the user.

Customer—The person or entity which would normally own the host device and who would purchase the discriminating data protection system. The customer may also be the administrator and/or the user.

When actions and/or events are specified as occurring before or after certain dates and/or times, it will be understood that such actions and/or events may also occur on or at such times and/or dates depending on the configuration of the discriminating data protection system. For example, if data created before a specified date is to be deleted, the system may be configured to delete data created at all times on prior dates, at all times up to midday of the specified date, or at all times up to the end of the specified date. The word 'time' may be used to refer to a day, an hour of a particular day, a period or a particular day (e.g. or AM or PM), or a time of a particular day.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions.

Exemplary Embodiment

A block diagram of a preferred embodiment of the Discriminating Data Protection System is shown by way of example in FIG. 1. The system generally comprises a discriminating data delete module 13 within a host 10, a monitoring center 19 and a customer center 20. An administrator visits the online manage/setup page 25 of the customer center 20 and sets up an offline data delete policy 18 for the host 10 which is stored in the database 23 of the monitoring center 19.

By way of example, the host shown in FIG. 1 may be a laptop computer, though this is for illustrative purposes only. It will be appreciated than a laptop computer is one of any number of electronic devices that may be configured according to aspects of the disclosed subject matter. Other examples include, but are not limited to: tablet computers, personal computers, netbooks, personal digital assistants (PDAs), wireless communication devices, mobile phones, and the like. Common to these electronic devices is a processor 33, a memory 31 (including persistent and/or volatile memory), and a network interface module 32.

The host 10 further comprises an agent 11 configured to communicate with monitoring center 19 via an internet connection 40 (which may be wired, wireless or both, a cellular or wired telephone connection, or any other appropriate connection permitting communication) and a persistence module 12 configured to restore the agent 11 if it becomes damaged or deleted. The agent 11 is preferably, but not necessarily, stored on the hard drive 31 of the host 10 (or in Flash memory or another type of non-volatile solid state memory of the host), and the persistence module 12 is preferably, but not necessarily, stored in BIOS 30 of the host 10. The agent 11 in its normal course of operation communicates periodically, randomly or from time to time via network interface module 32 with the monitoring center 19, provided that a suitable communication connection is available. The monitoring center 19 is communicably connected to the customer center 20 via a communication link 42, and downloads the components of the Discriminating Data Delete Module 13, including a copy 18A of the relevant portion of the Data Delete Policy 18, into the host 10 via connection 40. The agent 11 is also enabled, when communicating with the monitoring center 19, to download upgrades to the Discriminating Data Delete Module 13, to repair it, and in the case of a replacement hard drive being installed, to download the Discriminating Data Delete Module 13 to the new hard drive.

The agent 11 is operably connected to the Discriminating Data Delete Module 13. The Discriminating Data Delete Module 13 comprises a Trigger Detection Client 14, which monitors the time elapsed, as counted by Clock Utility 22, since the agent 11 last communicated with the monitoring center 19. When the time elapsed has reached a predetermined duration, the Trigger Action Client 15 causes certain events to occur. After an elapsed period of time (say, 7 days), such an event could be the periodic display of a warning message which directly or indirectly prompts the user to connect to the internet. Further, after another period of time (say, 3 days), as detected by the Trigger Detection Client 14, the Trigger Action Client 15 may reboot the host 10 and require a conventional Pre-Boot Password Client to run. After a predetermined number of failed attempts to enter a correct password, as determined by Trigger Detection Client 14, the Trigger Action Client 15 causes the Data Delete Client 17 to start. Data Delete Client 17 consults stored Data Delete Policy 18A and deletes the files in the host 10 that are specified by the Data Delete Policy 18A. Encryption Client 45 encrypts files according to the policy.

Operation of the Discriminating Data Delete Module 13 is ideally stealthy, such that it is not detected by illegitimate users, firewalls or anti-malware products, and does not, for example, show Windows Vista® user account control prompts.

The Data Delete Client 17 preferably performs a check which ensures that it only operates if an agent 11 is present. This helps prevent it from being used maliciously as a virus. For additional protection against misuse, the Data Delete Client 17 is preferably encoded to only run on a specific host 10. It could, for example, be encoded using the host's make, model and serial number, or with an electronic serial number (ESN) allocated to the host 10.

The Discriminating Data Delete Module 13 also optionally comprises a local Disable Utility 21, which allows a legitimate local user to disable the Discriminating Data Delete Module 13. The disablement is temporary and lasts until the following call the agent 11 makes to the monitoring center 13, unless in the interim the administrator has requested that the particular host 10 be removed from the Data Delete Policy 18.

The agent 11 may comprise a separate module as shown in FIG. 1, or it may be contained within the offline data delete module 13.

Functions 9 and 24-28 of the customer center 20 may be accessed via a web client, such as a browser running on a PC, a laptop, a smartphone or other internet-connectable electronic device. Physically, the customer center 20 is either connected to the monitoring centre 19 via communications link 42, or it can be part of the monitoring centre 19. By access to the customer center 20, an administrator can report a theft (or loss, etc.) 9, and view 24 data delete policies 18, which identify which files and/or folders are to be deleted should the Data Delete Client 17 of the Discriminating Data Delete Module 13 be triggered. It is possible for an administrator to be responsible for a quantity of laptops (hosts 10) or other electronic devices each operated by a different user, with possibly different offline data delete policies 18A specified for different subsets of the laptops. The administrator can set up, manage and amend policies 18 via a policy management facility 25 of the customer center 20. As an option, the administrator can make an online request for data deletion 26 in customer center 20. This request will be stored in the monitoring center 19 and passed to the agent 11 during a subsequent call by the agent 11 to the monitoring center 19. Also via customer center 20, an administrator can see a summary and details 27 of files and/or folders that have been deleted and/or encrypted, whether via an online data delete request 26 or via the offline triggering of the offline Data Delete Client 17. The administrator may also view the status 28 of individual hosts 10 as identified by their ESN's or some other more meaningful names provided by the administrator.

The user of the host 10 may access the clock utility 22, which indicates the time left until intermittent message display, the time left until pre-boot password requirement, and the time left until data deletion.

The durations specified above are not fixed and can be changed by the administrator or can be set to different default values via the customer center 20. The number of failed password attempts to be permitted can also be set or changed by the administrator, as can the type of message, if any, displayed by the host 10.

The customer center 20 may be operated from the same or a different server to that which the monitoring center 19 uses. The two centers may be in the same or in different geographic locations.

Other Embodiments

In contrast to the preceding embodiment, in which the host itself detects the theft (or likely theft), other embodiments can include hosts which need to be informed that they have been lost. In some of these embodiments, a call may be made to the host to inform it that it has been stolen, and that it should delete certain files according to a certain policy. In others of these embodiments, the host is configured to call into a monitoring centre from time to time, and can be informed during such a communication that it is to invoke data protection measures.

Functional Operation—Host Determines Theft

Figure 2:
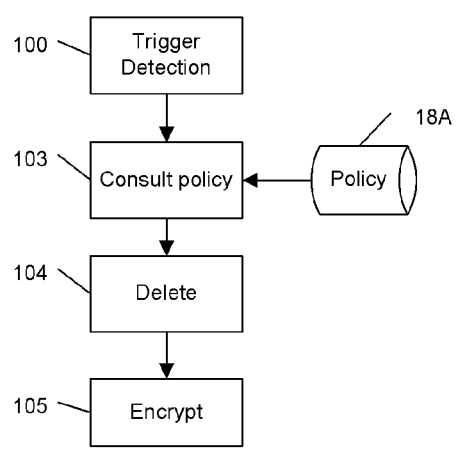
FIG. 2 is a functional flow diagram showing aspects of the operation of the discriminating data protection system of the embodiment of FIG. 1 in an electronic device that determines itself whether it is lost.

FIG. 2 is a flow diagram of the functional operation of the Discriminating Data Protection System of FIG. 1. Following installation of the Discriminating Data Protection Module 13, the Trigger Detection Client 14 detects 100 the likely theft of the host, or the need to take precautionary data protection measures. The trigger can be, inter alia: (1) the expiration of a period of time during which the host does not connect to the internet; (2) the use of the host without connection to the internet; (3) the use of the host without first inputting a password, which may be prompted or not; or (4) the input of a predetermined number of incorrect passwords.

If the Trigger Detection Client 14 detects a triggering event, it causes the Trigger Action Client 15 to take further action. This involves consulting 103 the stored Data Protection Policy 18A and invoking the Data Delete Client 17, which deletes 104 the files and/or folders specified by the policy 18A. The deletion ideally takes place in the background and the host 10 otherwise operates normally, so as not to alert a thief to the action being taken. Following the deletion, the Encryption Client 45 encrypts the files that may need to be protected, these being the files for which ownership is uncertain.

The policy 18A typically cannot specify in advance the folders, the files or the types of files that should be deleted in the event of a need to delete data. The problem is that if such a specification is made, then the data belonging to another party may be deleted by accident. Instead, the policy 18A specifies the data to be deleted in terms of one or more dates/times associated with the reported theft or loss of the computing device. For example, in one embodiment, the only data that is deleted is that which was created before the date/time the last internet connection (or call in to the monitoring centre) terminated. The policy 18A may further specify that data created after the termination of the last internet connection (or call to the monitoring centre), but before the trigger, is to be encrypted. Data created after the trigger does not have to be deleted nor encrypted, because it is assumed that the legitimate user would have prevented the trigger.

Functional Operation—Monitoring Centre Calls Host to Inform of Theft

Figure 3:
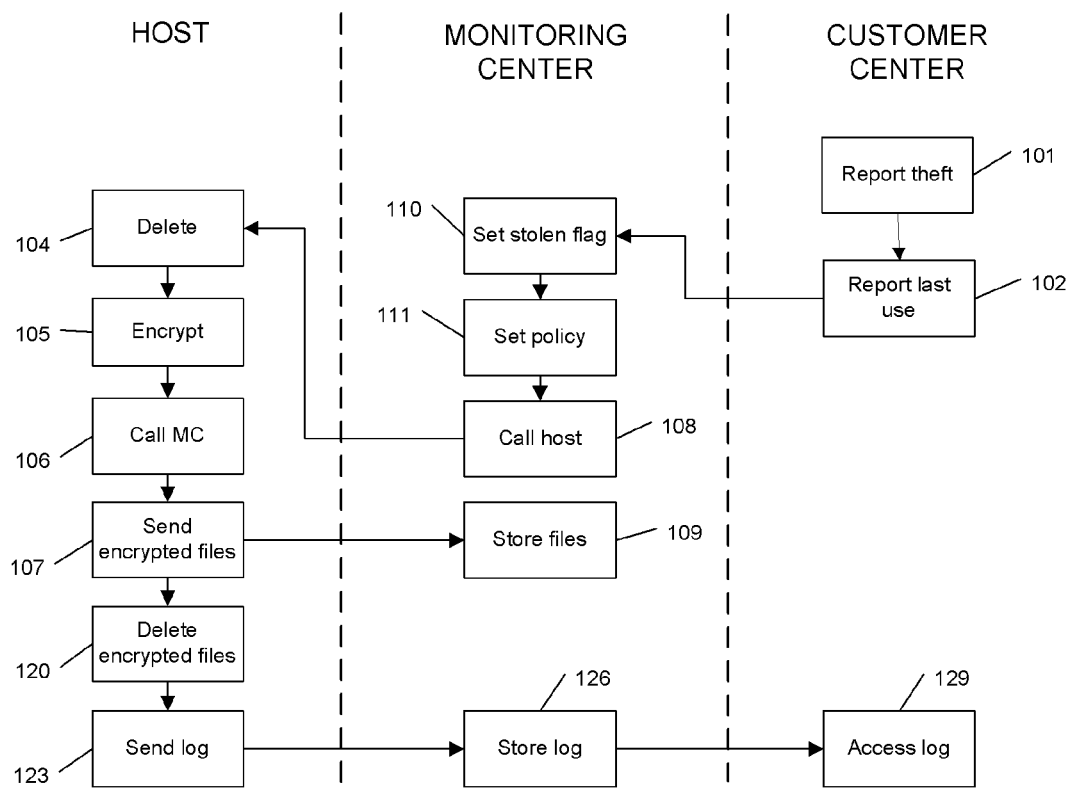
FIG. 3 is a functional flow diagram showing aspects the operation of the discriminating data protection system of the embodiment of FIG. 1 when the monitoring centre calls the host to inform of a theft.
Figure 4:
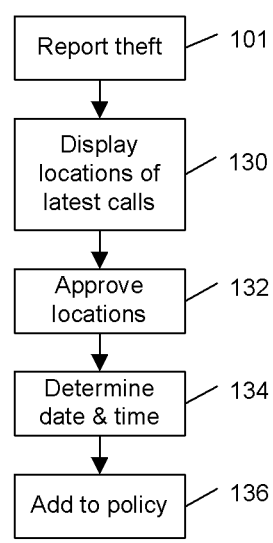
FIG. 4 is a functional flow diagram showing aspects the operation of the customer centre relating to determination of a key date for discriminating between two types of data in the discriminating data protection system of the embodiment of FIG. 1.

FIGS. 3 and 4 show a system in which the host 10 is configured to accept communications initiated by a monitoring centre 19. The user informs 101 the customer centre 20 of a theft, or of another need for the user's data to be deleted. This can be done by visiting a website, by faxing, emailing or telephoning etc. the customer centre 20. The customer centre 20 is equipped to record the last known date that the user last used the host 10, or when the host 10 was last known to be in the possession of the owner. If the user knows this date, it can be provided 102. If not—for example where the user uses the host rarely, or where the discovery of a theft is some time after the date it actually happened—then the customer centre 20 can display the location of the latest calls 130 (FIG. 4). The user can then select 132 the locations that are approved locations, being those where the host 10 can be considered to have been in the possession of the user. The latest date and time of the selected locations (i.e. the locations that are approved) are determined 134. Data created up to and including the latest time can safely be deleted. Data created after this time should be encrypted until its ownership can be determined. This date and time is added 136 to the data delete policy 18, the relevant part 18A of which is transmitted to the host 10. In some embodiments, default dates and times may be used that are based on predetermined time intervals before a theft is reported or a data delete request is made.

The relevant information from the customer centre 20 is transmitted to the monitoring centre 19, where a "lost/stolen" flag is set 110 and the data protection policy is also set 111. The monitoring centre 19 calls 108 the host 10 (e.g. via the internet, using SMS, by paging or by other mobile telecommunications) and instructs it to protect data according to the policy 18 which is also transmitted to the host 10. On receipt of the call, the host 10 starts to delete 104 the files that are to be deleted. Files to be encrypted are encrypted 105. In step 106, the host 10 calls the monitoring centre 19 to send 107 the encrypted files to it, where they are stored 109 in quarantine until their ownership can be determined and passwords or decryption keys are provided to the owner(s). Once the encrypted files have been transferred to the monitoring centre 19 they are deleted 120 from the host 10. A log file of the deletions and encryptions can be sent 123 to the monitoring centre 19 during the call or in a subsequent call. The monitoring centre 19 stores 126 the log file, which can be later accessed 129 by the user via the customer centre 20.

The continued normal operation of the host 10 during and following data deletion allows for the agent 11 to make future calls to the monitoring center 19 whenever the host 10 is connected to the internet, or when there is another communications line, which enables the host 10 to be monitored, tracked and then recovered by a law enforcement agency.

Functional Operation—Host Calls Monitoring Centre to be Informed of Theft

Figure 5:
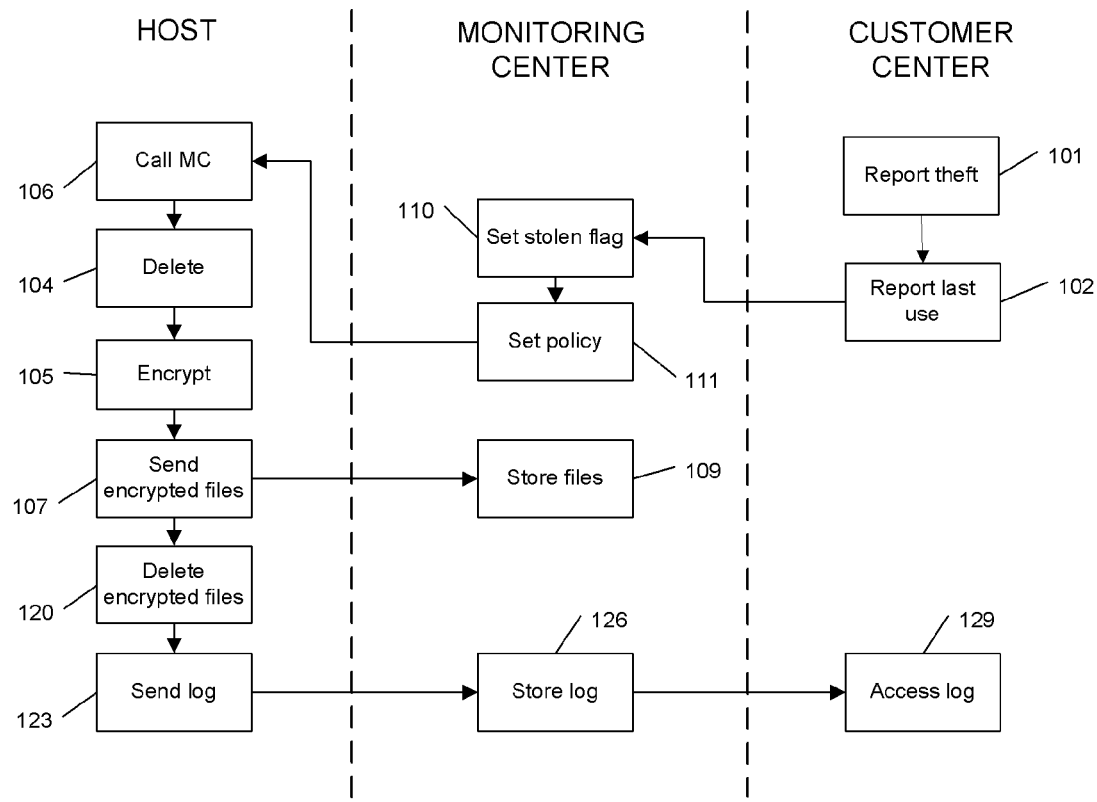
FIG. 5 is a functional flow diagram showing aspects the operation of the discriminating data protection system of the embodiment of FIG. 1 when the host calls the monitoring centre to be informed of a theft.

FIG. 5 shows the functioning of the system where the host 10 is configured to initiate calls to the monitoring centre 19 from time to time. Steps 101, 102, 110 and 111 are the same as for FIG. 3. After the setting 111 of the policy 18, the system is in a state of wait, in which a call from the host 10 to the monitoring centre 19 is awaited. When the host 10 calls 106 the monitoring centre 19, the instruction to delete and the policy 18 are transmitted to the host 10, which then deletes 104 and encrypts 105 the specified data. Encrypted files are sent 107 to the monitoring centre 19 to be stored 109, then deleted 120 from the host 10. A log file is created at the host 10 and sent 123 to the monitoring centre 19 to be stored 126, for later access 129 via the customer centre 20.

The functioning of the offline data delete system and method is further illustrated by specific use-case examples of its different modes of operation, which follow below.

Use-Case 1: Theft of Offline Data Delete Enabled Laptop

A laptop with offline data delete protection is stolen. The next day, the thief sells it to an unsuspecting purchaser who starts to use it offline. The laptop does not connect to the internet for several days causing the Discriminating Data Protection System to trigger. The owner's files are automatically deleted up to the date/time of the last occasion the laptop checked into the monitoring centre. The files created after this date/time are all encrypted. As there is no report of a theft, there is no date beyond which the data is left alone.

Use-Case 2: Theft of Laptop Protected by Monitoring Centre

Figure 6:
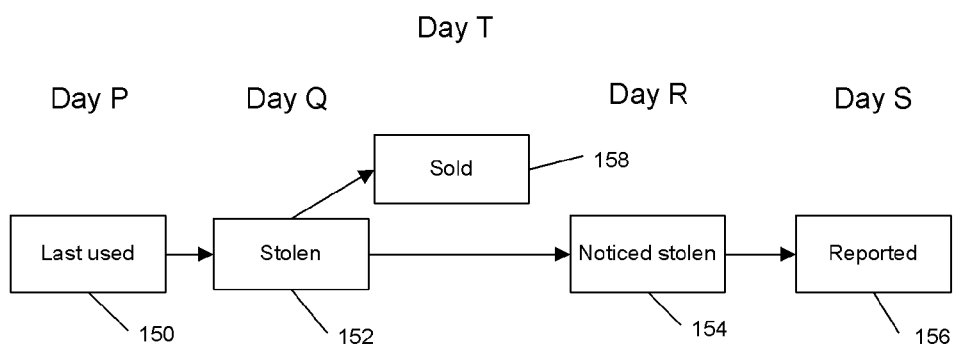
FIG. 6 is a use-case diagram showing a time line of dates following the theft of an electronic device comprising a discriminating data protection system in accordance with the embodiment of FIG. 1.

See FIG. 6. A host laptop is last used 150 on day P, stolen 152 on day Q, noticed stolen 154 on day R, reported 156 on day S and sold 158 to an otherwise innocent purchaser on day T, which could be any time on or after the date and time stolen 152. The user reporting the theft is unsure of date Q, and has no way of knowing what the date T is. The data created after day R is not deleted, nor encrypted. The data created before day P is deleted. The data created between days P and R is encrypted and quarantined. This minimizes the impact on the data added to the laptop by the innocent purchaser, while protecting the data of the original owner.

Use-Case 3: Company Laptop Not Returned by Laid-Off Employee

In this case, the company wants to delete all its data without destroying the data of the employee. When the instruction is given to delete the data, the key date is the last date of employment, and would be the equivalent of day P in FIG. 6. Data added after that date could all be encrypted as an inducement for the employee to return the machine in exchange for the release of the data.

Use-Case 4: Leased Computers

This is similar to Use-Case 3, but in this case a host laptop leased by someone is not returned on time, or payments are not made on time. In this case, all data can be encrypted until the laptop is returned or the rental fee is paid.

Use-Case 5: Company Laptop Permitted for Private Use

In this situation, the date cannot necessarily be used to discriminate between the data that should be deleted and the data that should be encrypted. The laptop is configured with a folder labeled "Personal", for example, where all personal documents are kept by the employee while working for the company. A prior agreement between the company and the employee allows the company to delete all files on the computer except for those in the "Personal" folder. In the case of refusal of the employee to return the computer, the company files are all deleted and the personal files are left untouched. In the case of theft, the company files with creation dates up to the last legitimate use are all deleted, the personal files are encrypted, and any files created between the last legitimate use and the date of the theft are encrypted.

Alternatives and Variations

A pop-up may be configured to appear on a host that has offline data delete enabled. For example, the message: "This computer has been stolen. Return to original owner by courier in exchange for the decryption key" may be displayed. More detailed return instructions can be provided. Data can be returned via internet or on a recordable medium.

Rather than encrypting the data, it could simply be backed up at the monitoring centre, then deleted from the host.

All of the methods and tasks described herein, excluding those identified as performed by a human, may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, include multiple distinct computers or computing devices (e.g., mobile devices, physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

The present description is of the best presently contemplated mode of carrying out the subject matter disclosed and claimed herein. The description is made for the purpose of illustrating the general principles of the subject matter and not be taken in a limiting sense; the claimed subject matter can find utility in a variety of implementations without departing from the scope and spirit of the invention made, as will be apparent to those of skill in the art from an understanding of the principles that underlie the invention. The scope of the invention is best determined with reference to the appended claims.

What is claimed is:

1. A non-transitory computer readable medium having stored thereon an agent program that instructs an electronic computing device to at least:

determine, in response to a trigger which indicates a likely theft or loss of the device, a first point in time prior to the trigger, said first point in time being associated with a last known use prior to the theft or loss of the electronic computing device;

identify a first set of files on the device that were created prior to said first point in time;

identify a second set of files on the device that were created between said first point in time and the trigger, and which were therefore potentially created by an innocent user after the theft or loss of the device; and execute, in connection with the theft or loss, a discriminating data protection policy that treats the first set of files differently from the second set of files.

2. The computer readable medium of claim 1, wherein the agent program further instructs the electronic computing device to:

determine, in response to said trigger, a second point in time, wherein the second point in time is after the first point in time, and is a reported date of theft or loss of the device, wherein the second set of files consists of files created between the first point in time and the second point in time;

identify a third set of files on the device that were created after the second point in time; and discriminate, in executing the discriminating data protection policy, between: (1) the first set of files stored on the computing device that were created before the first point in time, (2) the second set of files stored on the computing device that were created between the first point in time and the second point in time, and (3) the third set of files stored on the computing device that were created after the second point in time.

3. The computer readable medium of claim 1, wherein the trigger comprises a failure of a current user to supply a valid access credential.

4. The computer readable medium of claim 2, wherein the agent program instructs the electronic computing device to:

transmit the second set of files to a monitoring center in encrypted or unencrypted form, and to then delete the second set of files from the device;

delete the first set of files from the computing device without first transmitting the first set of files to the monitoring center; and leave the third set of files intact on the device.

5. The computer readable medium of claim 1, wherein the agent program instructs the electronic computing device to delete the first set of files, and to encrypt or quarantine the second set of files.

6. The computer readable medium of claim 1, wherein the agent program instructs the electronic computing device to delete the first set of files only.

7. The computer readable medium of claim 1, wherein the first point in time is a date of last known authorized use of the device prior to the theft or loss of the device.

8. The computer readable medium of claim 1, wherein the trigger is one of:

a. an elapse of a predetermined time interval during which a communication over a network with a monitoring center is not made;
b. use of the electronic computing device without connection to the internet;
c. use of the device without input of a correct password;
d. input of a predetermined number of incorrect passwords; or
e. a combination of an elapse of a predetermined time interval during which a communication over a network with a monitoring center is not made and the input of a predetermined number of incorrect passwords.

9. The computer-readable medium of claim 1, wherein the first point in time is based on a last connection established between the electronic computing device and a monitoring center.

10. The computer-readable medium of claim 9, wherein the trigger is an event in which a client component running on the computing device detects, based on usage of the electronic computing device, a likely theft of the electronic computing device.

11. A system for protecting data, the system comprising:
an electronic computing device having a processor and a memory, the electronic computing device configured to:
determine, in response to a trigger which indicates that the device has likely been lost or stolen, a first point in time associated with a last known use prior to the theft or loss of the electronic computing device, said first point in time being prior to said trigger;
identify a first set of files on the device that were created prior to said first point in time;
identify a second set of files on the device that were created between said first point in time and the trigger, and which were therefore potentially created by an innocent user after the theft or loss of the device; and
execute, in connection with the theft or loss, a discriminating data protection policy that treats the first set of files differently from the second set of files.

12. The system of claim 11, wherein the electronic computing device is configured to communicate over a network with a monitoring center to implement the discriminating data protection policy.

13. The system of claim 12, wherein the electronic computing device is configured to receive, from the monitoring center, a notification of the theft or loss, said notification identifying said first point in time.

14. The system of claim 11, wherein the electronic computing device is further configured to:
determine, in response to said trigger, a second point in time, wherein the second point in time is after the first point in time, and is a reported date of theft or loss of the device, wherein the second set of files consists of files created between the first point in time and the second point in time;
identify a third set of files on the device that were created after the second point in time; and
discriminate, in executing said discriminating data protection policy, between: (1) the first set of files stored on the computing device that were created before the first point in time, (2) the second set of files stored on the computing device that were created between the first point in time and the second point in time, and (3) the third set of files stored on the computing device that were created after the second point in time.

15. A method for protecting data stored on an electronic computing device until ownership of the data can be determined, the method comprising:
by the electronic computing device under control of an agent program:
determining, in response to a trigger which indicates that the device has likely been lost or stolen, a first point in time associated with a last known use prior to a theft or loss of the electronic computing device, said trigger occurring after said first point in time;
identifying a first set of files on the device that were created prior to said first point in time;
identifying a second set of files on the device that were created between said first point in time and the trigger, and which were therefore potentially created by an innocent user after the theft or loss of the device; and
executing, in connection with the theft or loss, a discriminating data protection policy that treats the first set of files differently from the second set of files.

16. The method of claim 15, further comprising the steps of:
determining, in response to said trigger, a second point in time associated with the theft or loss of the electronic computing device, wherein the second point in time is after the first point in time, and is a reported point in time of theft or loss of the device, wherein the second set of files consists of files created between the first point in time and the second point in time;
identifying a third set of files on the device that were created after the second point in time; and
executing, in connection with the theft or loss, a discriminating data protection policy that discriminates between: (1) the first set of files stored on the computing device that were created before the first point in time, (2) the second set of files stored on the computing device that were created between the first point in time and the second point in time, and (3) the third set of files stored on the computing device that were created after the second point in time.

17. The method of claim 15, wherein the first point in time is based on a last connection established between the electronic computing device and a monitoring center.

18. The method of claim 17, wherein the trigger is an event in which the agent program detects, based on usage of the electronic computing device, a likely theft of the electronic computing device.

19. The method of claim 17, wherein the first point in time is based on a last internet connection established by the electronic computing device.

* * * * *